United States Patent
Szekely, Jr. et al.

(10) Patent No.: US 7,441,537 B2
(45) Date of Patent: Oct. 28, 2008

(54) METHOD AND APPARATUS TO CONTROL COMBUSTION IN A SPRAY-GUIDED DIRECT INJECTION SPARK-IGNITED ENGINE

(75) Inventors: Gerald A. Szekely, Jr., Sterling Heights, MI (US); Mark S. Huebler, Shelby Township, Macomb County, MI (US); Scott E. Parrish, Farmington Hills, MI (US); Gerald J. Schimelfening, Shelby Township, MI (US); Andreas M. Lippert, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 192 days.

(21) Appl. No.: 11/549,682

(22) Filed: Oct. 16, 2006

(65) Prior Publication Data

US 2007/0175438 A1 Aug. 2, 2007

Related U.S. Application Data

(60) Provisional application No. 60/727,655, filed on Oct. 18, 2005.

(51) Int. Cl.
*F02B 3/00* (2006.01)
*F02D 41/38* (2006.01)
(52) U.S. Cl. ...................... 123/299; 123/305
(58) Field of Classification Search ................. 123/299, 123/305, 295; 701/103–105
See application file for complete search history.

(56) References Cited

U.S. PATENT DOCUMENTS

| | | | |
|---|---|---|---|
| 6,089,077 A | 7/2000 | Daniels | |
| 6,401,703 B1 | 6/2002 | Mamiya et al. | |
| 6,520,142 B2 * | 2/2003 | Nogi et al. | 123/299 |
| 6,659,074 B2 | 12/2003 | Lippert et al. | |
| 7,252,069 B2 * | 8/2007 | Date et al. | 123/299 |
| 7,370,628 B2 * | 5/2008 | Eves et al. | 123/299 |
| 2004/0011326 A1 | 1/2004 | Yamashita et al. | |
| 2007/0068466 A1 * | 3/2007 | Kulzer | 123/305 |

FOREIGN PATENT DOCUMENTS

| | | |
|---|---|---|
| JP | 2004-100603 A * | 4/2004 |
| JP | 2007-278257 A * | 10/2007 |

OTHER PUBLICATIONS

Szekely, G, Combustion Characteristics of a Spray-Guided DI Stratified Charge Engine with a High Squish Piston, SAE Tech Paper, 2005-01-1937, SAE Warrendale PA USA.

* cited by examiner

*Primary Examiner*—Hieu T Vo (57) ABSTRACT

A method and apparatus to operate a spray-guided spark-ignition direct fuel injection internal combustion engine are provided. The invention comprises injecting a first quantity of fuel during a combustion cycle. Spark ignition is initiated, and, injection of a second quantity of fuel is controlled effective to propagate a flame kernel generated by the spark ignition, after the initiation of the spark ignition during the combustion cycle.

21 Claims, 11 Drawing Sheets

METHOD AND APPARATUS TO CONTROL COMBUSTION IN A SPRAY-GUIDED DIRECT INJECTION SPARK-IGNITED ENGINE

CROSS-REFERENCE TO RELATED APPLICATIONS

This application claims the benefit of U.S. Provisional Application No. 60/727,655 filed Oct. 18, 2005, entitled METHOD AND APPARATUS To CONTROL COMBUSTION IN A SPRAY-GUIDED SPARK-IGNITED ENGINE.

TECHNICAL FIELD

This invention pertains generally to internal combustion engine control systems, and more specifically to control combustion through precise fuel injection in internal combustion engine systems.

BACKGROUND OF THE INVENTION

Implementers of engine control schemes face continued requirements to improve fuel economy and reduce quantities of various emissions constituents, including hydrocarbons, carbon monoxide, carbon dioxide, and nitrides of oxygen ($NO_x$). One engine configuration and control strategy comprises a spray-guided spark-ignited direct-injection gasoline engine to realize better combustion stability, better fuel economy and lower emissions. A main benefit of an engine employing spray-guided fuel injection is improved fuel economy, because the engine is operable at a lean fuel/air equivalence ratio at low-to-medium engine loads and at low-to-medium engine speeds. However such operation may affect combustion stability of the engine.

Various fuel injection and ignition system designs and control strategies have been shown to improve combustion stability, resulting in improved fuel economy and lower combustion emissions. Exemplary methods include: a wider or narrower injector spray cone, a higher or lower injection rate, and, a spark-plug gap that is located inside, on the edge, or outside the fuel spray cone. Current injection and ignition strategies wherein fuel is completely injected before ignition suffer from poor combustion stability, which can result in increases in emissions, fuel consumption, and smoke.

There is a need to provide an improved strategy to address the concerns mentioned hereinabove.

SUMMARY OF THE INVENTION

Therefore, in accordance with an embodiment of the present invention, a method and apparatus to operate a spray-guided spark-ignition direct fuel injection internal combustion engine are provided. The invention comprises injecting a first quantity of fuel during a combustion cycle. Spark ignition is initiated, and, injection of a second quantity of fuel is controlled effective to propagate a flame kernel generated by the spark ignition, after the initiation of the spark ignition during the combustion cycle.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
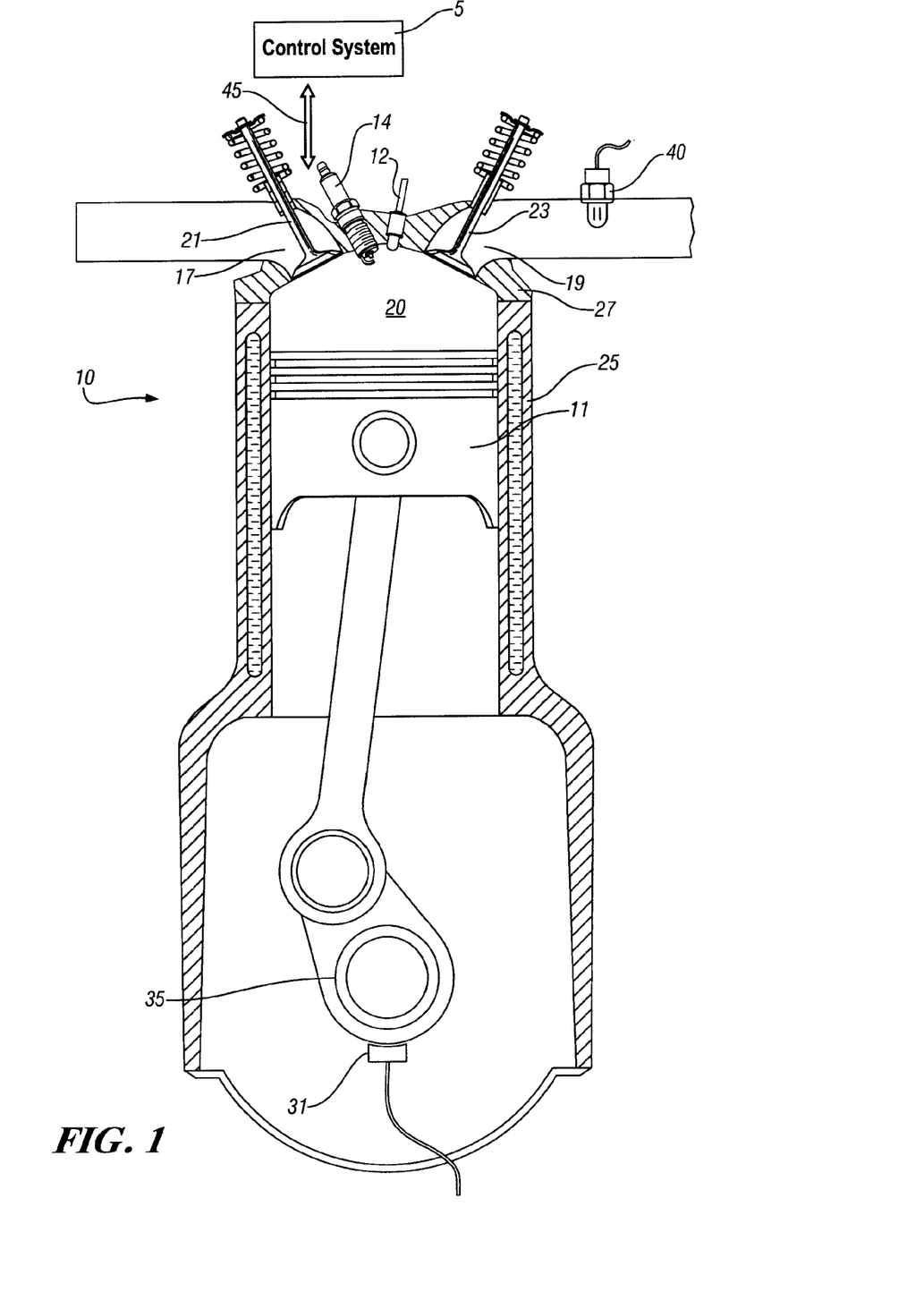
FIG. 1 is a schematic illustration of an internal combustion engine, in accordance with the present invention; and, FIGS. 2-20 are exemplary data-graphs, in accordance with the present invention.

Referring now to the drawings, wherein the figures are for the purpose of illustrating the invention only and not for the purpose of limiting the same, FIG. 1 depicts a schematic of an internal combustion engine 10 and control system 5 which has been constructed in accordance with an embodiment of the present invention. The exemplary engine comprises a direct-fuel-injection, spray-guided, spark ignition (SIDI) engine employing a high-squish combustion chamber geometry operating in a stratified-combustion charge regime. The engine control system is operative to control fuel injection through rapid pulsing of fuel injectors, as described hereinafter. It is understood that the present invention is applicable to any direct-injection, spark-ignited internal combustion engine capable of operating with a stratified charge of a fuel-air mixture and operative to control fuel injection as described.

The present invention comprises an injection-after-ignition strategy, which enables the exemplary engine having spray-guided injection capability to operate in lean mode with improved combustion stability. Therefore, injection after ignition is preferable for spray guided engines in the regions whereat they achieve a fuel economy benefit from operating with a lean equivalence ratio compared to fully premixed engine operation. The exemplary injection-after-ignition strategy includes precisely injecting a small quantity of fuel just after start of ignition. The present invention is applicable to a multi-cylinder, spray-guided, direct fuel injection, spark-ignition, four-stroke internal combustion engine having individual cylinder fuel control.

Referring again to FIG. 1, the exemplary engine comprises a plurality of variable volume combustion chambers 20, each defined by a closed-end cylinder formed in an engine block 25. A moveable piston 11 defines, with walls of the cylinder, the variable volume combustion chamber 20. A rotatable crankshaft 35 is connected by a connecting rod to each piston 11, which reciprocates in the cylinder during ongoing operation. A cylinder head 27 is sealably attached to the block 25 at an end thereof distal from the crankshaft 35, and forms the combustion chamber 20 with the cylinder walls and the piston 11. The cylinder head 27 provides a structure for intake port 17, exhaust port 19, intake valve(s) 21, exhaust valve(s) 23, in-cylinder fuel injector 12, and spark plug 14. The fuel injector 12 is fluidly connected to a pressurized fuel supply system to receive fuel and is operative to directly inject or spray pressurized fuel into the combustion chamber 20 periodically during ongoing operation of the engine. Actuation of the fuel injector 12, and other actuators described herein, is controlled by an electronic engine control module ('ECM'), which is an element of the control system 5. Spark plug 14 comprises a known device operative to ignite a fuel/air mixture formed in the combustion chamber 20. The spark plug has a tip portion inserted in the combustion chamber which includes an electrode and a cathode having a spark plug gap formed therebetween. The fuel injector and the spark plug tip are preferably placed in relative proximity to one another, such that injected fuel interacts with the spark plug tip. An ignition module, controlled by the ECM, controls ignition by discharging requisite amount of electrical energy across the spark plug gap at appropriate times relative to combustion cycles, creating an electrical arc across the gap. The intake port 17 channels air to the combustion chamber 20. Flow of air into the combustion chamber 20 is controlled by one or more intake valves 21, operatively controlled by a valve actuation device such as a camshaft (not shown). Combusted (burned) gases flow from the combustion chamber 20 via the exhaust port 19, with the flow of combusted gases through the exhaust port controlled by one or more exhaust valves 23 operatively controlled by a valve actuation device such as a second camshaft (not depicted). Specific details of a control scheme to control opening and closing of the valves are not detailed. It is understood that various engine components, including valve control mechanisms and schemes for variable cam phasing and variable valve actuation, fall within the purview of the invention. Other generally known aspects of engine and combustion control are known and not detailed herein. In at least one embodiment of the invention, the engine is configured to achieve in-cylinder swirl of the air-fuel charge. This can be accomplished with such systems as swirl injectors, or by employing butterfly valves to control intake flow through one of two intake valve ports when the engine intake manifold and cylinder head is so equipped.

The fuel injector 12 preferably comprises a piezoelectric fuel injector device able to precisely meter a prescribed quantity of fuel and rapidly deliver the fuel to the vicinity of the spark-plug gap during a narrow window of time when growth of a flame kernel at the plug gap is just beginning to accelerate. Delivering the fuel too late or too slowly can impede the early flame kernel growth, leading to locally lean combustion with combustion instability, or retarded combustion phasing. Delivering the fuel too early or too quickly can overwhelm the flame kernel, leading to locally rich combustion with combustion instability and high carbon monoxide and smoke (particulate matter) emissions. The preferred fuel injector has a high injection pressure (20 MPa) to provide the requisite fuel injection rate and spray atomization. The fuel injector preferably repeatedly opens and closes extremely rapidly at precisely controlled times and for extremely short durations to inject the requisite quantity of fuel. The exemplary piezoelectric injector varies the injection rate by altering the magnitude of injector pintle lift, without adversely affecting the spray quality. In addition, rapid opening and closing nature of the piezoelectric injector system enables multiple, precisely controlled injection events, each accurately delivered for a specified duration and timing within the same engine cycle. Multiple injection events within a given engine cycle are required to achieve delivery of the bulk of the fuel for mixing with air before the ignition event, which is followed by the short injection event to accurately and precisely deliver the small quantity of fuel after the initiation of the ignition event.

As previously described, the ECM is preferably an element of the overall control system 5 comprising a distributed control module architecture operative to provide coordinated powertrain system control. The powertrain system control is effective to control the engine to meet operator torque demands, including power for propulsion and operation of various accessories. The ECM synthesizes pertinent information and inputs from sensing devices, including a crank sensor 31 and an exhaust gas sensor 40, and executes algorithms to control operation of various actuators, e.g., the fuel injector 12 and the ignition module, to achieve control targets, including such parameters as fuel economy, emissions, performance, driveability, and protection of hardware. The ECM is preferably a general-purpose digital computer generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) conversion circuitry, and input/output circuitry and devices (I/O) and appropriate signal conditioning and buffer circuitry. A set of control algorithms, comprising resident program instructions and calibrations, is stored as machine-executable code in ROM and executed to provide the respective functions. Algorithms are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

CONTROL OF THE EXEMPLARY ENGINE

The invention comprises operating the exemplary engine, including controlling actuation of the exemplary fuel injectors 12 effective to control combustion. The engine operation comprises injecting a first quantity of fuel into the combustion chamber 20 by actuating the injector 12 one or more times, preferably prior to igniting the spark plug 14. Immediately after igniting the spark plug 14, a second quantity of fuel is injected effective to propagate the flame kernel generated by the igniting of the spark plug. Injecting the first quantity of fuel comprises timing injection of the first fuel pulse or pulses effective to achieve a preferred fuel/air mixture preparation in the combustion chamber. The preferred fuel/air mixture typically comprises a fuel pulse of sufficient mass to power the engine to meet the operator torque demands, balanced against engine operation which meets emissions and smoke requirements and combustion stability. Igniting the spark plug preferably comprises timing the spark plug ignition effective to achieve a mean-best-torque (MBT) of the engine at the engine operating conditions. Spark timing for MBT is typically determined based upon a predetermined engine calibration which takes into account factors related to engine speed and load, coolant temperature, EGR fraction, and other engine operating factors. Alternatively, when the engine is initially operating after a cold start, the ignition timing can be retarded from the MBT point, to maximize thermal energy sent to an exhaust aftertreatment system, thus effecting rapid heat-up and light-off of components of the exhaust aftertreatment system. The second injection, effective to propagate the flame kernel, is precisely controlled such that a relatively small mass of fuel, e.g., in the range of 1.0-2.5 milligrams (mg), is injected into the combustion chamber after an elapsed time of 100 to 300 milliseconds (ms) after initiating the ignition of the spark plug. The multiple fuel injections described herein is preferably executed during low to medium engine load operating conditions.

Injecting the small quantity of fuel immediately after initiating the ignition event substantially improves repeatability and robustness of early flame kernel development in the exemplary spray-guided spark-ignited direct-injection gasoline engine. The described injection event improves air-fuel mixture conditions at the spark plug gap location during the early stages of the combustion process. This, in turn, improves overall repeatability and robustness of the entire combustion process, resulting in smooth, consistent engine operation as measured by such parameters as coefficient of variation of indicated mean effective pressure (COV-IMEP), as is depicted with reference to FIG. 3. In addition, injecting the second, small quantity of fuel after the start of the ignition process decouples the fuel injection and spark ignition events of the exemplary spray-guided, spark-ignition, direct-injection gasoline engine. Decoupling the injection and ignition events in this manner enables the injection events before ignition to be timed to yield optimum fuel and air mixture preparation, while enabling the ignition event to be timed to yield optimum combustion phasing to meet operator torque demands and other engine operating demands. This action maximizes fuel economy and minimizes combustion emissions of the engine operation.

The preferred injection-after-ignition strategy provides emissions and fuel economy benefits in engine operating regions comprising light-to-medium engine load range and low-to-medium engine speed ranges, which comprise operating regions wherein the direct-injection engine is operated in a stratified-charge mode. In the stratified-charge operating mode, fuel injection timing occurs late in the engine cycle, just before the spark ignition event is initiated. The preferred stratified-charge operating region for the embodiment comprises an area indicated by net-mean-effective pressure (NMEP) of less than about 580 kPa, and an engine speed of less than about 3600 RPM, as depicted on the engine map illustrated in FIG. 4, which is considered typical for spray-guided engines. To evaluate effectiveness of the exemplary injection-after-ignition strategy, operation of the injection after ignition strategy is preferably evaluated by several different types of tests executed during operation within the stratified-charge operating region of the engine.

Figure 4:
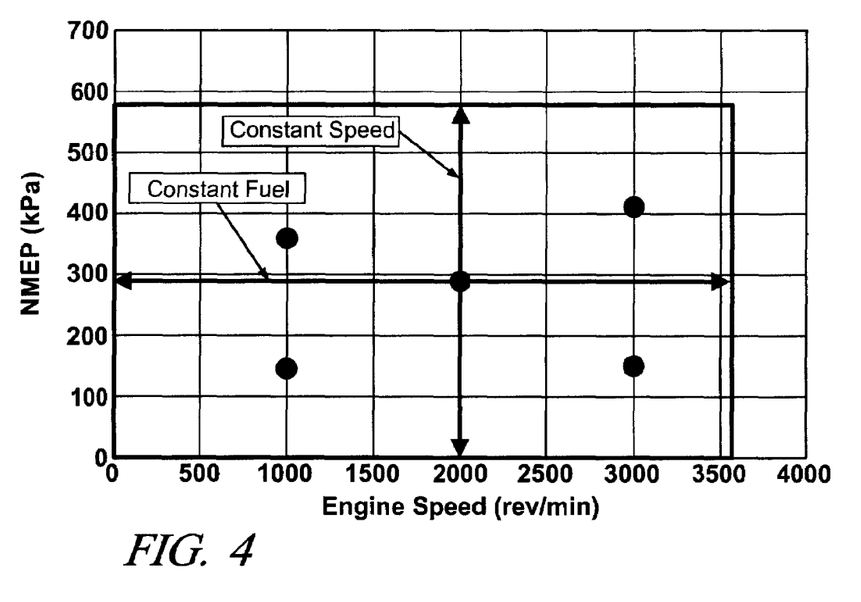

The first evaluation test comprises five speed and fueling operating test points, depicted as dots in FIG. 4, which comprise: 1000 RPM, low engine load; 1000 RPM, high engine load; 2000 RPM, medium engine load; 3000 RPM, low engine load; and, 3000 RPM, high engine load. Three of the points lie along a typical road-load curve of the exemplary engine, and comprise typical loads and speeds the engine encounters when the vehicle is operated over flat, level ground at different engine speeds. These three test points are indicated by three test points of FIG. 4 that sweep across the plot from the lower left to the upper right of the plot. The fourth point comprises operation at low engine speed and high engine load indicative of a hard accelerating condition, e.g., driving up a hill. The fifth operating point comprises a high engine speed, light engine load operating point, indicative of a decelerating condition, e.g., coasting down a hill. In addition to these five test points, a speed hook (i.e., operating the engine at a constant fueling rate during medium engine load condition), and a fueling rate hook (i.e., operating the engine at a constant engine speed of 2000 RPM) were performed, as indicated by the solid Constant Speed line and solid Constant Load line depicted in FIG. 4. All test conditions are at a sufficiently high exhaust-gas recirculation (EGR) level such that an emissions index of oxides of nitrogen ($EINO_x$) is less than a predetermined threshold.

The injection-after-ignition strategy is applicable during a cold-engine start condition, as it allows ignition timing to be sufficiently retarded to maximize thermal energy sent to the catalyst or other exhaust aftertreatment devices, thus allow rapid heat-up and light-off of the various aftertreatment components.

Figure 5:
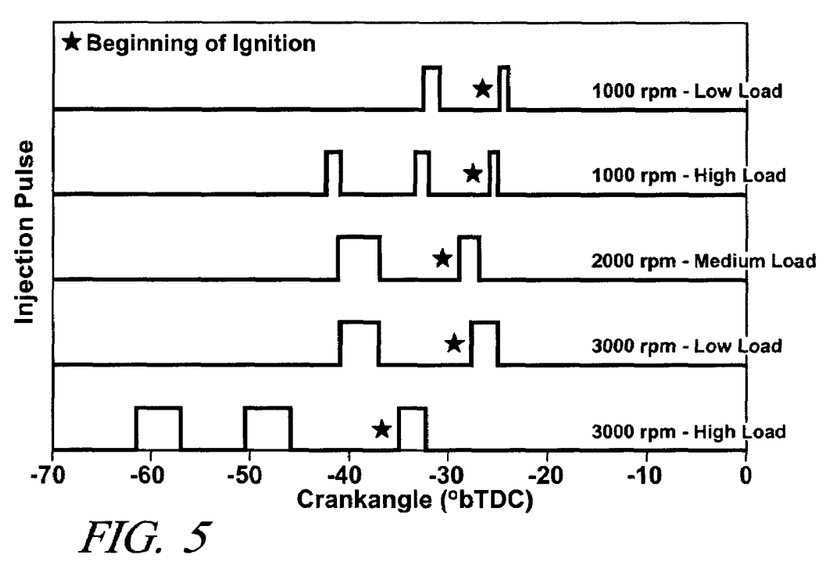

The injection and ignition timings used for the injection after ignition strategy at each of these five test points are illustrated in FIG. 5. In this diagram, the beginning of the ignition event is marked by a star, and opening and closing of the injector is marked by the lines showing injector pulses. At each speed/load operating point, approximately 2 mg of fuel was injected approximately 200 milliseconds after start of ignition. Ignition timing was optimized to give the best overall combustion phasing with the best fuel economy and lowest emissions, i.e., at mean-best-torque, and the injection pulse strategy before the ignition event was optimized to give the best mixture preparation resulting in the lowest carbon monoxide and smoke emissions. A single injection pulse was used before ignition at low engine loads. Two injection pulses were used before ignition to better mix the fuel and air prior to ignition at the high speed-high engine load condition.

RESULTS OF THE ENGINE CONTROL

Figure 2:
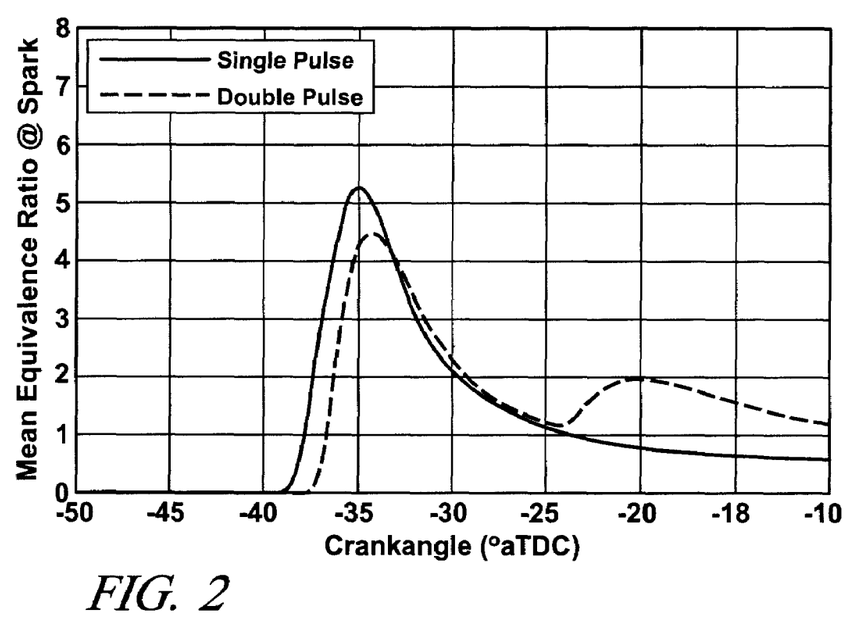

Referring now to FIG. 2, fuel/air equivalence ratios near the spark plug gap are plotted as a function of engine crank angle for single and double-pulse injections. For the single-pulse injection event, the fuel/air equivalence ratio at the spark-plug gap leans out rapidly, as depicted by the curve shown as a solid line. The double pulse injection is effective to maintain the equivalence ratio at the spark-plug gap at or above a fuel/air equivalence ratio of 1.0, i.e., at or rich of stoichiometry, which is more conducive to complete combustion.

Figure 3:
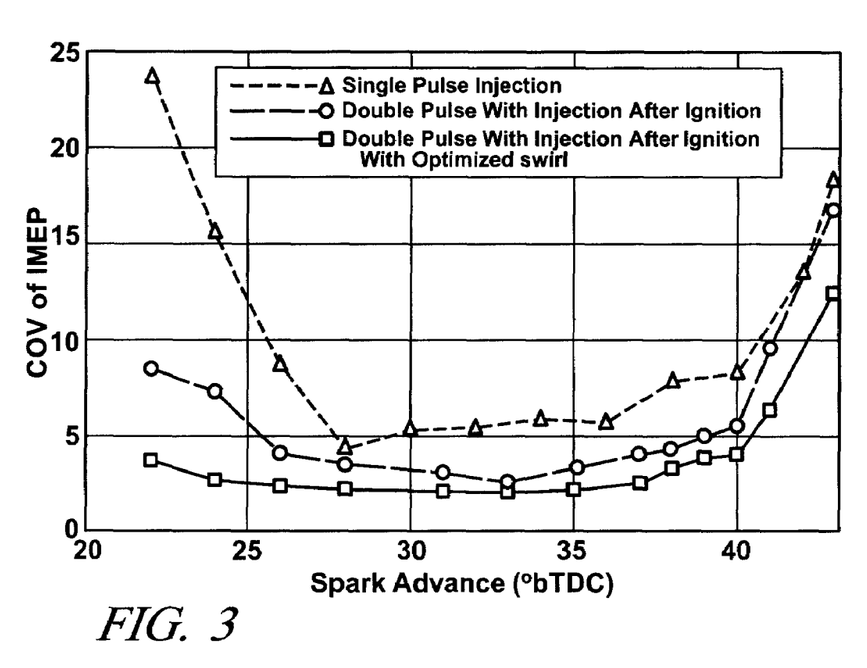

Referring now to FIG. 3, exemplary results showing combustion stability, measured in terms of COV-IMEP under different fuel injection pulse conditions, is depicted over a range of ignition spark advance values. The exemplary results were obtained by operating the exemplary engine at 2000 RPM at a medium engine load. Combustion robustness is substantially improved when the timing for the second injection pulse is specified in a manner that the fuel spray from the second injection pulse begins to arrive at the spark-plug gap after ignition, and concurrent with the flame kernel growth beginning to accelerate. The second injection, occurring after start of ignition improves combustion stability, and increases range of ignition timing over which improved combustion stability is obtained. In order to achieve optimum fuel-air mixing at the time of ignition, leading to improved ignition robustness, it is likely that more injection pulses are required prior to ignition at heavier engine loads. In addition, higher injection rates are required at heavier engine loads, as compared to low engine loads. Furthermore, to enhance fuel-air mixing and ignition robustness, a sufficiently high level of combustion chamber swirl is likely required to extend the crank angle range during which reliable ignition occurs. The results depicted with reference to FIG. 3 indicate that an increase in swirl from a minimum value to a medium swirl level resulted in further improvement in combustion stability (COV-IMEP), and the range of ignition timing over which the improved combustion stability is obtained.

Figure 6:
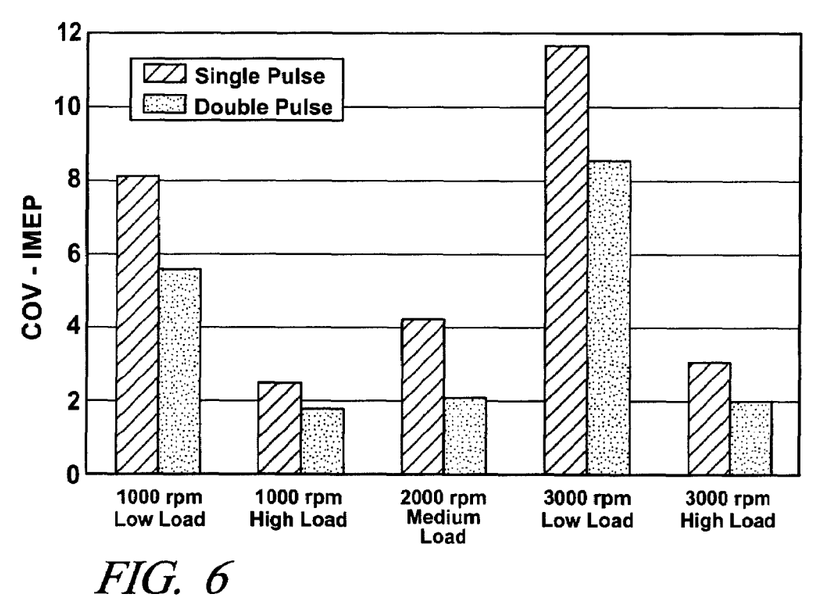

Referring now to FIG. 6, the combustion stability results for the injection after ignition strategy compared to the traditional single pulse injection are depicted, measured as COV-IMEP. A low value for COV-IMEP indicates a smoother operating engine, as compared to a higher value for COV-IMEP. The executed injection-after-ignition strategy substantially improved the combustion stability at each of the five test points.

Figure 7:
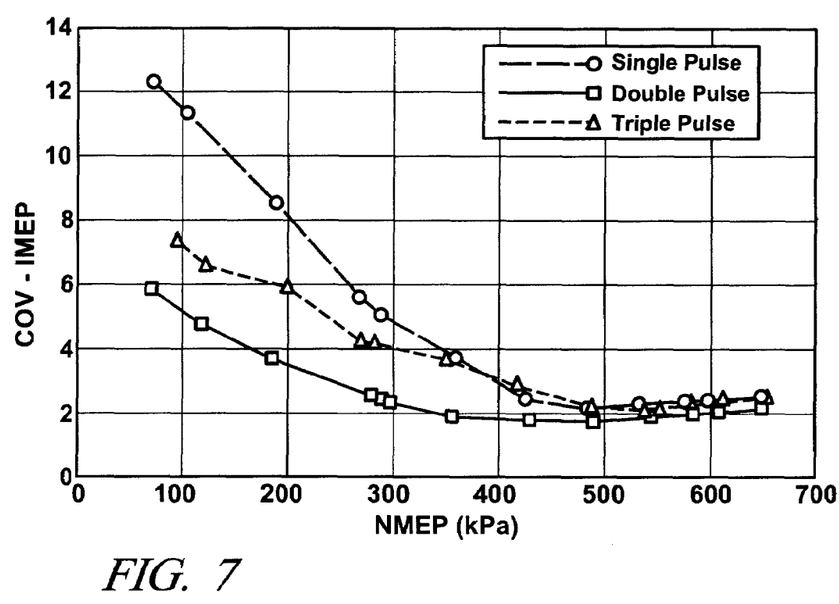
Figure 8:
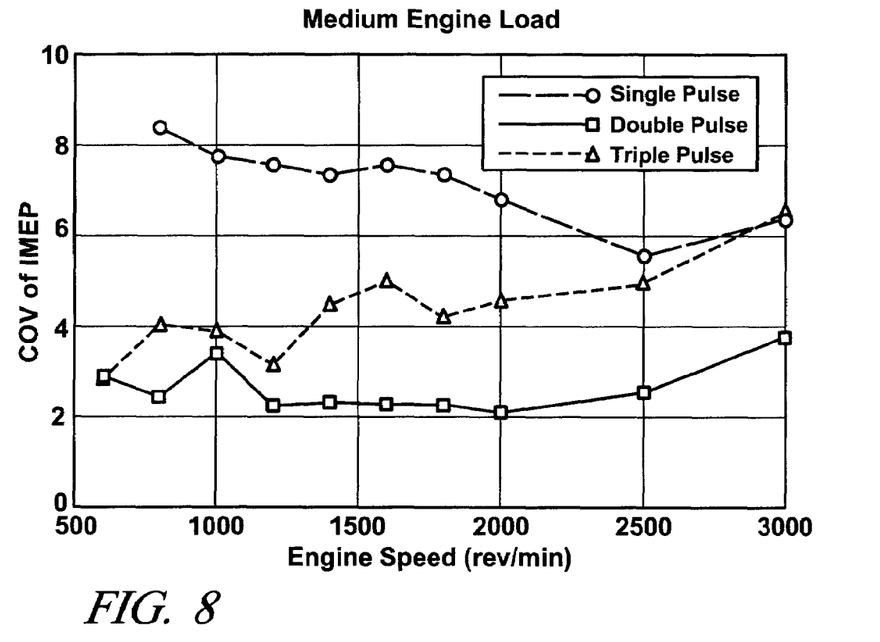

Referring now to FIGS. 7 and 8, combustion stability improves for the fueling rate hooks at constant engine speed and for the engine speed hooks at constant fueling rate. The double pulse injection strategy (i.e., one pulse before ignition and one pulse after ignition) is shown to be optimal when operating the engine at an engine speed of 2000 RPM applying the fueling rate hook depicted in FIG. 7. Similarly at the medium engine load operating point, for the engine speed hook depicted in FIG. 8, the double pulse injection (i.e., one injection pulse before ignition and one injection pulse after ignition) strategy is optimal. Across the entire engine speed/load range within the stratified charge operating regime of the exemplary engine, the strategy of injection-after-ignition provides the most stable and smoothest engine operation, as measured by COV-IMEP.

Figure 9:
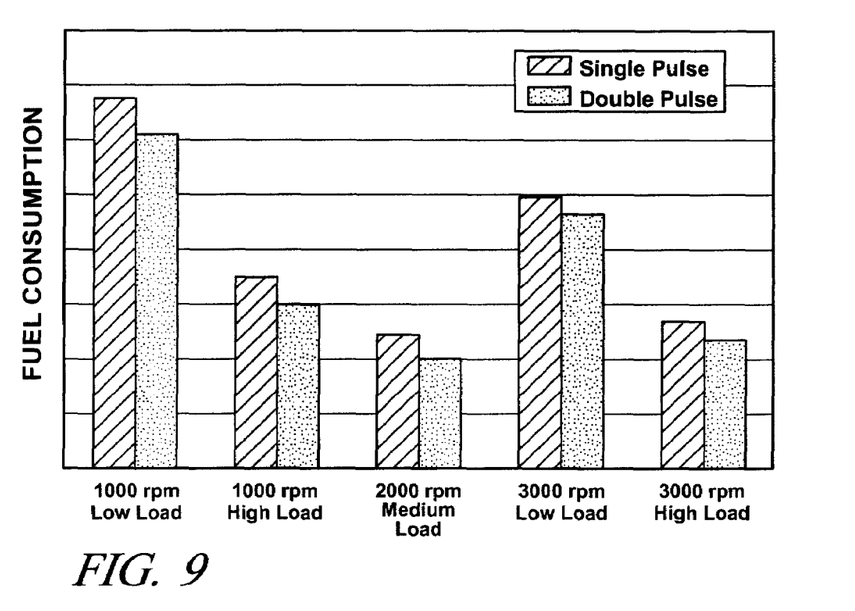
Figure 10:
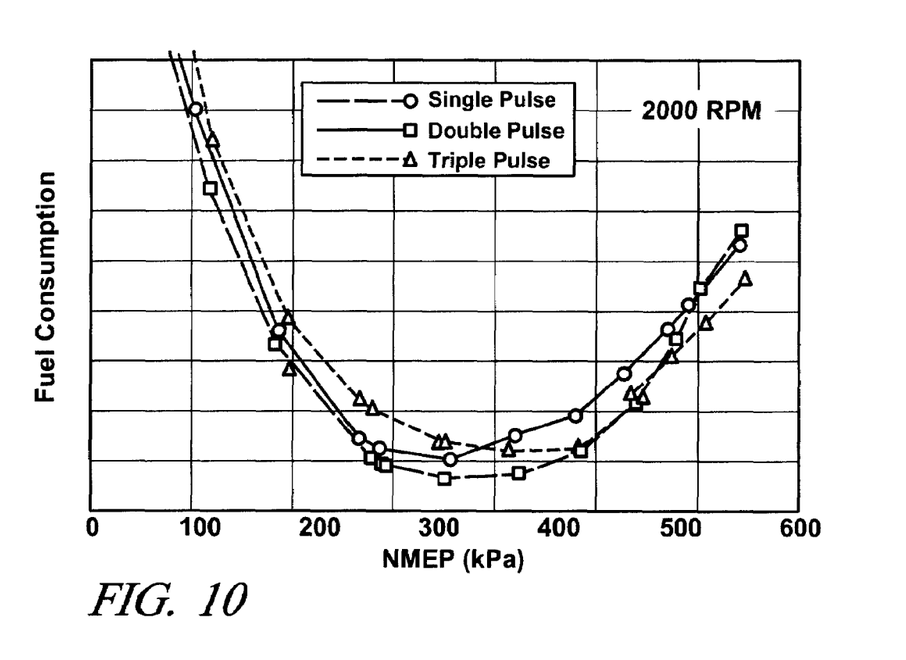
Figure 11:
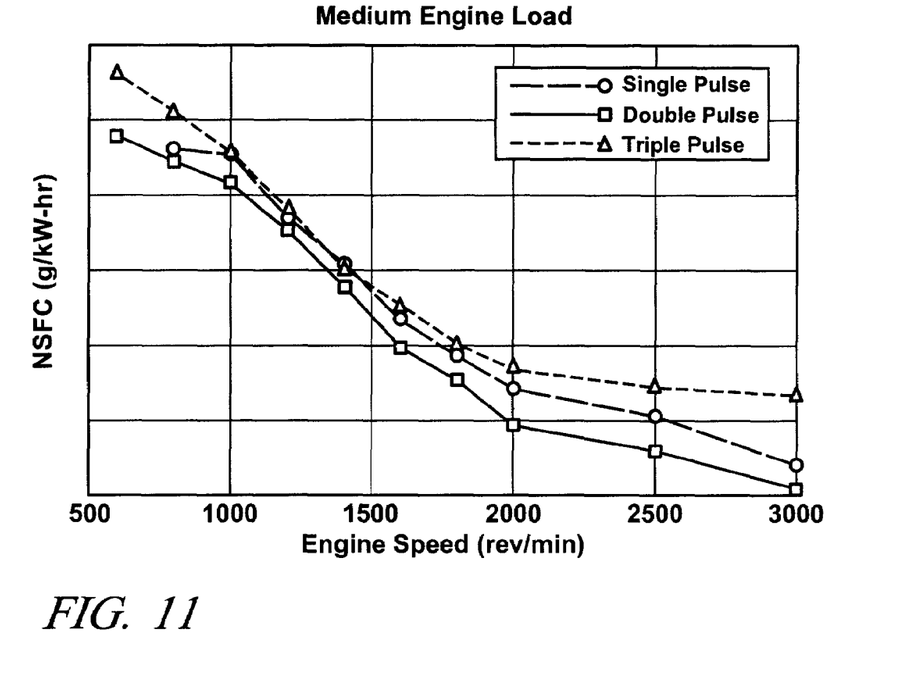

Referring now to FIG. 9, the improved combustion stability of the injection-after-ignition strategy allows the combustion process to be slightly retarded so that it is optimally phased. This leads to improved fuel economy and reduced emissions. Engine fuel consumption rates, measured in Net Specific Fuel Consumption (NSFC), in g/kW-hr, at the five test points are depicted. In each case, the fuel consumption rate is improved for the injection-after-ignition strategy depicted, compared to the standard injection strategy depicted. The fuel consumption rate is improved by the injection-after-ignition for the fueling rate hooks at constant engine speed over a varying engine load (NMEP) and for the engine speed hooks at constant fueling rate as depicted in FIG. 10 and FIG. 11. For each of these hooks, the double pulse injection strategy (i.e., one pulse before ignition and one pulse after ignition) is optimal over most of the range. The results of FIG. 10 demonstrate that at high engine loads, a triple pulse injection strategy (i.e., two pulses before ignition and one pulse after ignition) is optimal. Thus across the entire engine speed and load range within the stratified charge operating regime of the engine, the injection-after-ignition strategy leads to a lower fuel consumption rate compared to the standard single injection pulse before ignition strategy.

Figure 12:
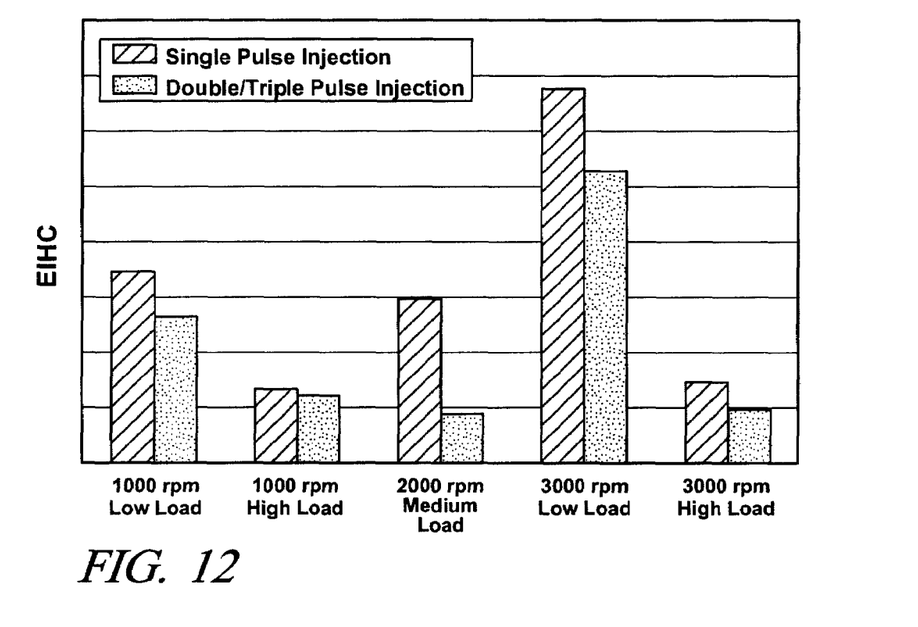
Figure 13:
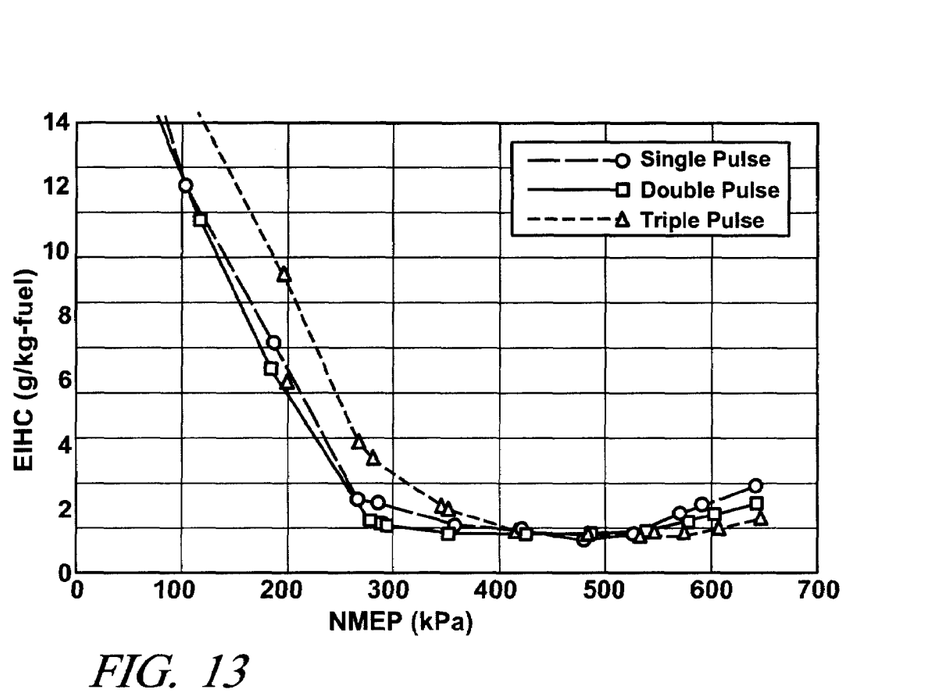
Figure 14:
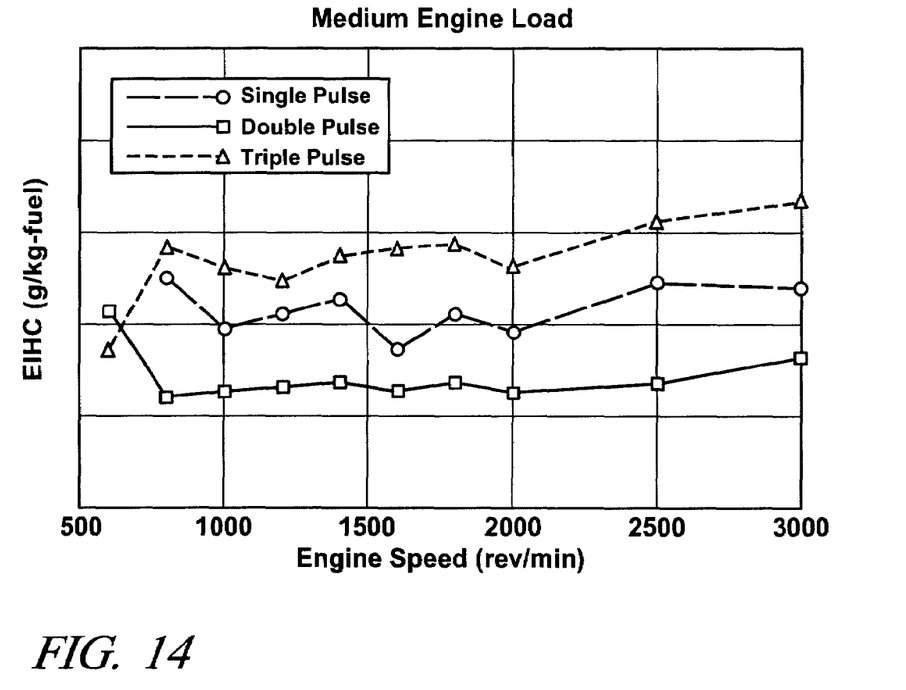

Referring now to FIGS. 12, 13, and 14, results demonstrate that hydrocarbon emissions (EIHC) for the injection-after-ignition strategy are improved over the standard injection-before-ignition strategy across the entire engine speed and load range within the stratified charge operating regime of the exemplary engine. The lower hydrocarbon emissions result from improved combustion stability of the injection-after-ignition strategy because engine misfire cycles are likely reduced or eliminated, and, each cycle is likely burning a higher percentage of the injected fuel.

Figure 15:
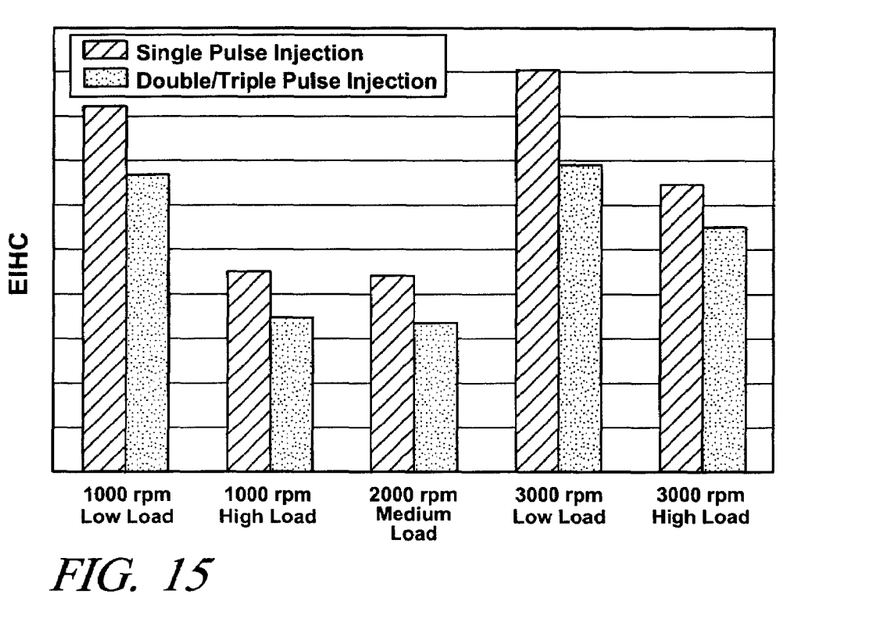
Figure 16:
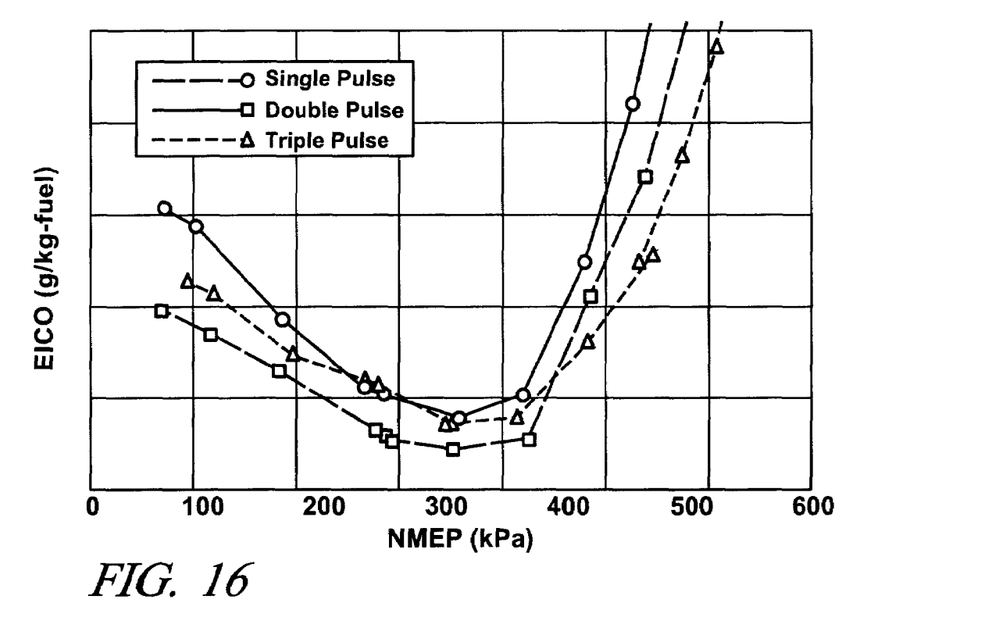
Figure 17:
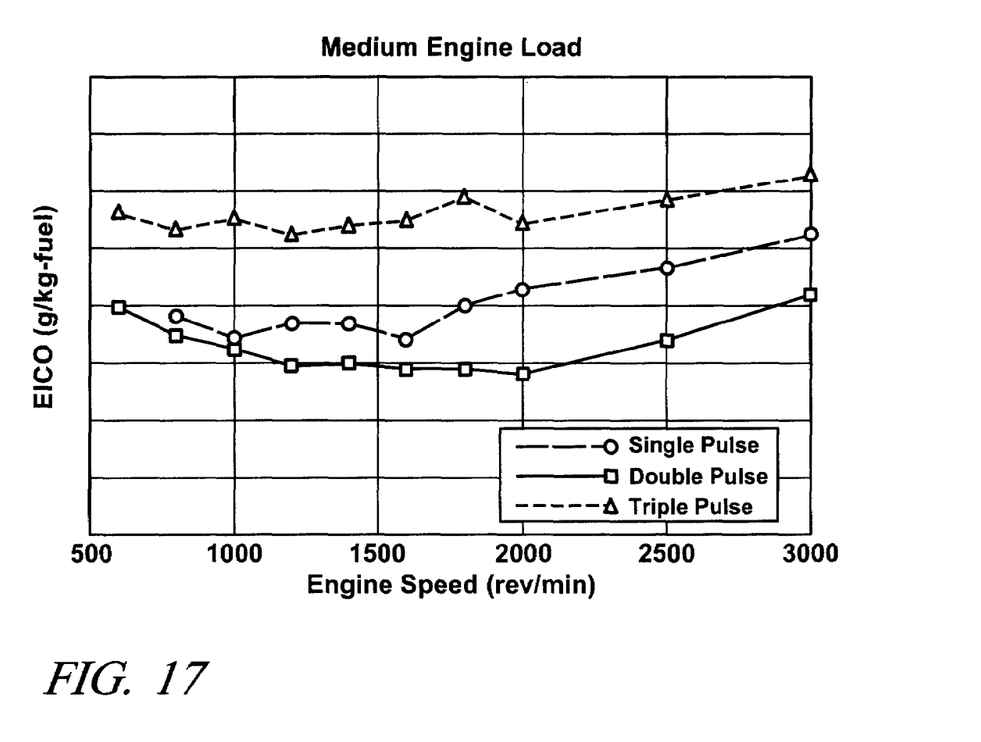

Carbon monoxide emissions are an indication of mixture preparation, i.e., how well fuel and air are mixed together prior to combustion. Combustion that occurs near an optimal equivalence ratio typically leads to minimum carbon monoxide emissions. Combustion that occurs at either excessively rich or excessively lean equivalence ratio result in higher carbon monoxide emissions. The lower carbon monoxide emission levels for the five test points depicted in FIG. 15 and for the engine load and engine speed hook results depicted in FIG. 16 and FIG. 17 indicate that the injection-after-ignition strategy has an improved mixture preparation, compared to the other system, and result in combustion near the optimum equivalence ratio.

Figure 18:
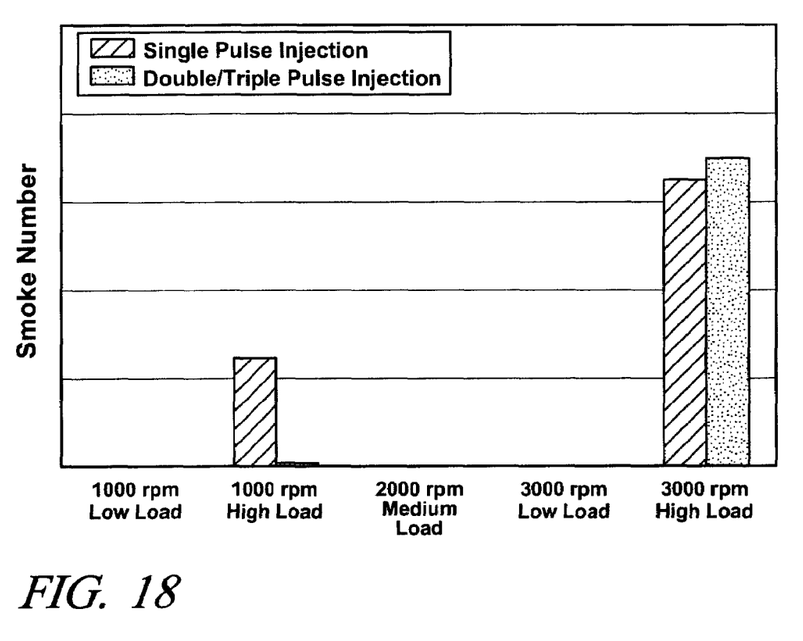
Figure 19:
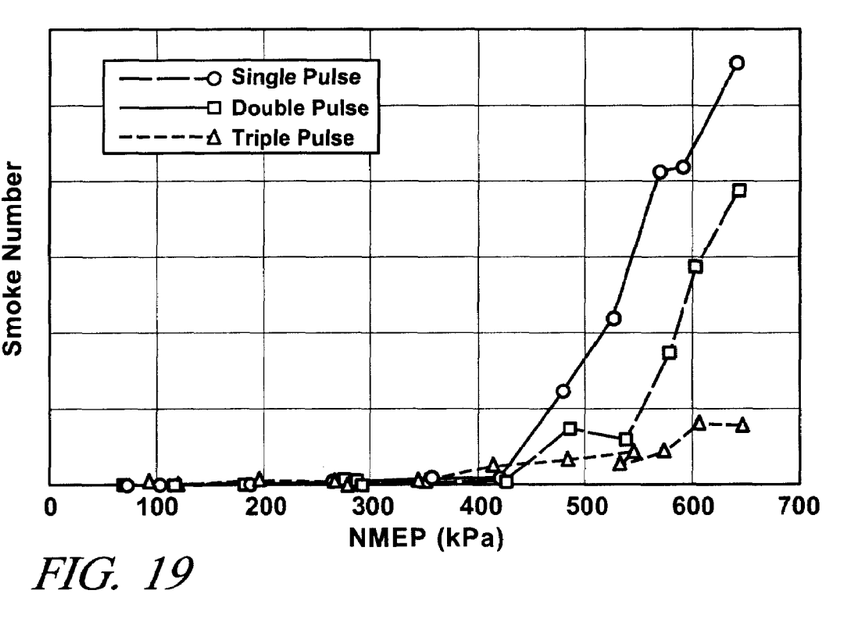
Figure 20:
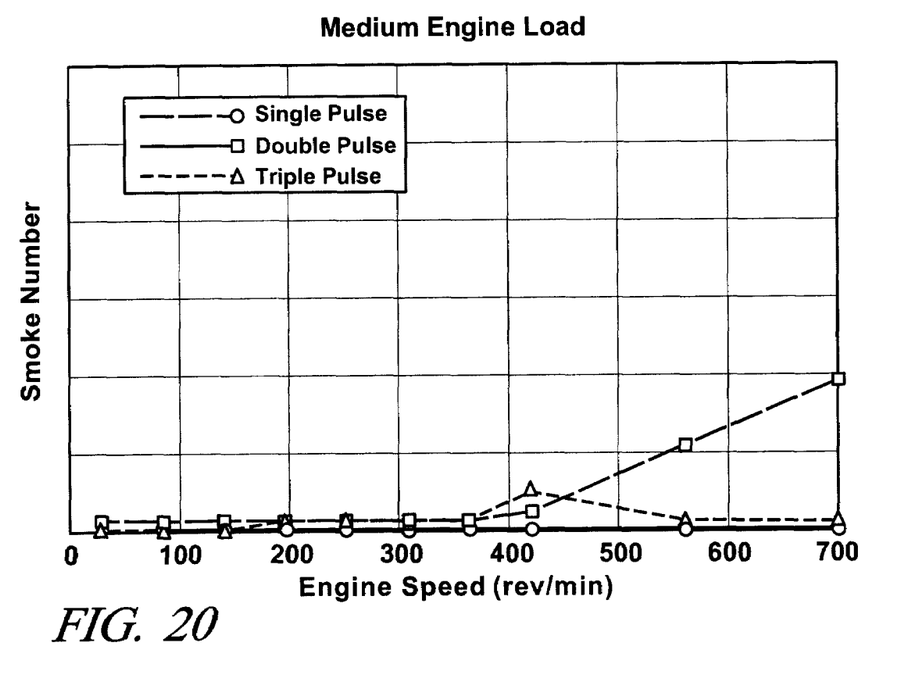

Timing of the final injection pulse for the injection-after-ignition strategy is critical. When the final pulse occurs too soon after ignition, the fuel spray overwhelms the developing flame kernel, leading to rich combustion and resulting in substantially higher smoke (i.e., particulate matter or PM) emissions. An overwhelmed flame kernel also leads to higher carbon monoxide emissions. The results of FIG. 18 demonstrate that properly timed injection after ignition strategy eliminates PM emissions at all but the heavy load, high speed test point. The results of FIGS. 19 and 20 demonstrate that PM emissions are reduced across the engine speed/load operating range within the stratified charge operating regime of the engine for the injection-after-ignition strategy, as compared to the standard injection-before-ignition strategy. The results of FIG. 19 further demonstrate that at high engine loads with the injection-after-ignition strategy, two injection pulses before ignition allows the fuel and air to mix more completely, permitting combustion to occur at a more optimal equivalence ratio and result in reduced PM emissions. The higher PM emissions shown for the triple pulse injection (two pulses before ignition and one pulse after ignition) curve shown with reference to FIG. 20 likely results from insufficient time after ignition before the final injection pulse. Other tests (not shown) demonstrate that smoke is substantially reduced or eliminated by retarding the final injection pulse relative to ignition timing at these conditions.

The invention has been described with specific reference to the embodiments and modifications thereto. The specific details of the control schemes and associated results described herein are illustrative of the invention as described in the claims. Further modifications and alterations may occur to others upon reading and understanding the specification. It is intended to include all such modifications and alterations insofar as they come within the scope of the invention.

Having thus described the invention, it is claimed:

1. Method to operate a spray-guided spark-ignition direct fuel injection internal combustion engine, comprising:
   injecting a first quantity of fuel during a combustion cycle;
   initiating spark ignition;
   controlling injection of a second quantity of fuel during the combustion cycle effective to propagate a flame kernel generated by initiating the spark ignition.

2. The method of claim 1, further comprising injecting the first quantity of fuel prior to initiating the spark ignition.

3. The method of claim 2, wherein injecting the first quantity of fuel comprises timing injection of the first quantity of fuel pulse effective to achieve a preferred fuel/air mixture preparation.

4. The method of claim 3, wherein injecting the first quantity of fuel further comprises injecting a mass of fuel effective to power the engine to substantially meet an operator torque demand.

5. The method of claim 4, wherein injecting the first quantity of fuel further comprises executing a plurality of fuel injection pulses.

6. The method of claim 3, further comprising controlling timing of initiating the spark ignition effective to achieve an optimal engine output determined based upon combustion variation and an operator torque demand.

7. The method of claim 3, further comprising controlling timing of initiating the spark ignition effective to achieve heating of an exhaust aftertreatment system downstream of the engine.

8. The method of claim 1, wherein initiating the spark ignition further comprises controlling timing of the initiating of the spark ignition effective to achieve optimal operation of the engine determined based upon combustion variation and an operator torque demand.

9. The method of claim 1, wherein controlling injection of the second quantity of fuel during the combustion cycle effective to propagate the flame kernel generated by initiating the spark ignition comprises controlling timing of the second injection relative to initiating the spark ignition.

10. The method of claim 9, further comprising controlling the timing of the second injection to be within a range of 100 to 300 milliseconds after initiating the spark ignition.

11. The method of claim 10, wherein controlling injection of the second quantity of fuel further comprises controlling mass of the second injection to be a quantity within a range of 1.0 to 2.5 milligrams of fuel.

12. The method of claim 1, further comprising executing the second injection only during operation of the engine in a low to medium load range.

13. Method to minimize combustion variation of a spray-guided, spark-ignition, direct fuel injection internal combustion engine, comprising the following steps in the order set forth:
- injecting a first quantity of fuel during a combustion cycle;
- initiating spark ignition;
- controlling injection of a second quantity of fuel during the combustion cycle effective to propagate a flame kernel generated by initiating the spark ignition.

14. The method of claim 13, wherein injecting the first quantity of fuel comprises:
- timing injection of at least one fuel pulse effective to achieve a preferred fuel/air mixture preparation, and,
- injecting a mass of fuel effective to power the engine to substantially meet an operator torque demand.

15. The method of claim 13, further comprising controlling timing of initiating the spark ignition effective to achieve a mean-best-torque of the engine.

16. The method of claim 13, further comprising inducing in-cylinder swirl in the combustion chamber.

17. The method of claim 13, wherein controlling injection of the second quantity of fuel further comprises:
- controlling timing of the second injection relative to initiating the spark ignition within a range of 100 to 300 milliseconds after initiating the spark ignition, and,
- controlling mass of the second injection to be a quantity within a range of 1.0 to 2.5 milligrams of fuel.

18. Method to control spark ignition timing independently of fuel injection timing in a spark-ignition, direct fuel injection internal combustion engine during each combustion cycle, comprising:
- injecting a first quantity of fuel at an optimal time for fuel/air mixture preparation;
- initiating spark ignition at a spark advance effective to achieve an engine output optimized based upon engine torque and combustion variation; and,
- injecting a second quantity of fuel effective to propagate a flame kernel generated by initiating the spark ignition of the combustion charge resulting from injecting the first quantity of fuel.

19. The method of claim 18, wherein injecting the first quantity of fuel at an optimal time for fuel/air mixture preparation comprises: injecting the first quantity of fuel effective to minimize carbon monoxide and smoke emissions.

20. The method of claim 18, wherein injecting the second quantity of fuel further comprises:
- controlling timing of the second fuel injection to begin within a range of about 100 to 300 milliseconds after initiating the spark ignition, and,
- controlling mass of the second fuel injection to be a quantity ranging from about 1.0 to about 2.5 milligrams of fuel.

21. Article of manufacture, comprising a storage medium having machine-executable code encoded therein to control operation of a spark-ignition, direct fuel injection internal combustion engine effective to minimize combustion variation, the code comprising:
- code to inject a first quantity of fuel during a combustion cycle;
- code to initiate and control the spark ignition;
- code to control injection of a second quantity of fuel during the combustion cycle effective to propagate a flame kernel generated by initiating the spark ignition.

* * * * *